(12) United States Patent
Luce et al.

(10) Patent No.: US 12,492,072 B2
(45) Date of Patent: Dec. 9, 2025

(54) SYSTEMS AND METHODS OF A BATTERY RETRIEVAL AND INSTALLATION TOOL

(71) Applicant: Schlumberger Technology Corporation, Sugar Land, TX (US)

(72) Inventors: Thomas Luce, Katy, TX (US); Julien Toniolo, Sugar Land, TX (US); Varun Phadke, Pune (IN); Suman Velvaluri, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/731,503

(22) Filed: Jun. 3, 2024

(65) Prior Publication Data
US 2025/0368435 A1    Dec. 4, 2025

(51) Int. Cl.
*B65G 1/04*    (2006.01)
*H01M 50/244*    (2021.01)

(52) U.S. Cl.
CPC ......... *B65G 1/0435* (2013.01); *H01M 50/244* (2021.01)

(58) Field of Classification Search
CPC .................................................... B65G 1/0435
USPC .................................. 320/109; 414/280–283
See application file for complete search history.

(56) References Cited

U.S. PATENT DOCUMENTS

| 668,109 | A | * | 2/1901 | Mailloux | B60K 1/04 104/34 |
|---|---|---|---|---|---|
| 718,543 | A | * | 1/1903 | Starks | B65G 1/0435 414/280 |
| 2,820,642 | A | * | 1/1958 | Harper | B60P 3/11 104/126 |
| 3,075,659 | A | * | 1/1963 | Sylvester | B65G 37/00 414/351 |
| 3,549,025 | A | * | 12/1970 | Messner | B66F 9/141 187/360 |
| 4,227,463 | A | * | 10/1980 | Pfleger | B60K 1/04 187/253 |
| 4,450,400 | A | * | 5/1984 | Gwyn | B60L 53/80 414/373 |
| 4,787,801 | A | * | 11/1988 | Ahlsen | B62D 65/18 29/430 |
| 5,187,423 | A | * | 2/1993 | Marton | B60K 1/04 414/281 |

(Continued)

FOREIGN PATENT DOCUMENTS

CN    202389699 U    8/2012
CN    108807782 A    11/2018
(Continued)

*Primary Examiner* — James Keenan
(74) *Attorney, Agent, or Firm* — Jeffrey D. Frantz

(57) ABSTRACT

A system is provided that includes a tool of a battery installation and retrieval system. The tool includes a tray configured to support a battery and a battery drive assembly. The battery drive assembly includes a battery positioner used to move along an axial path of travel and a battery interconnect configured to couple the battery to the battery positioner. The battery drive assembly may also include a battery drive coupled to the battery positioner used to actuate the battery positioner to move the battery along the axial path of travel between a transfer state on the tray and a storage state in a battery rack.

17 Claims, 7 Drawing Sheets

(56) References Cited

U.S. PATENT DOCUMENTS

| | | | | |
|---|---|---|---|---|
| 5,545,967 | A * | 8/1996 | Osborne | H02J 7/0013 |
| | | | | 320/109 |
| 6,094,028 | A * | 7/2000 | Gu | H01M 10/441 |
| | | | | 320/109 |
| 7,534,083 | B2 * | 5/2009 | Trudeau | B62D 63/061 |
| | | | | 414/483 |
| 7,686,176 | B2 * | 3/2010 | Murata | B66C 1/28 |
| | | | | 414/940 |
| 8,240,711 | B1 * | 8/2012 | Horrell | B62D 43/002 |
| | | | | 280/769 |
| 8,366,371 | B2 * | 2/2013 | Maniscalco | H01M 50/204 |
| | | | | 414/222.07 |
| 8,868,235 | B2 * | 10/2014 | Zhao | B25J 13/088 |
| | | | | 700/253 |
| 8,875,826 | B2 * | 11/2014 | Franzen | B60L 50/66 |
| | | | | 180/68.5 |
| 2016/0075539 | A1 * | 3/2016 | Calkin | A62B 5/00 |
| | | | | 254/335 |
| 2024/0124228 | A1 * | 4/2024 | Komura | B65G 1/0435 |
| 2024/0400305 | A1 * | 12/2024 | Iwamoto | B65G 1/065 |
| 2025/0019163 | A1 * | 1/2025 | Tsuji | B65G 1/04 |

FOREIGN PATENT DOCUMENTS

| | | |
|---|---|---|
| CN | 108974569 A | 12/2018 |
| CN | 112932105 A | 6/2021 |
| CN | 214527990 U | 10/2021 |
| CN | 115973952 A | 4/2023 |
| JP | 6376378 B2 | 8/2018 |

\* cited by examiner

SYSTEMS AND METHODS OF A BATTERY RETRIEVAL AND INSTALLATION TOOL

BACKGROUND

The present disclosure generally relates to systems and methods for retrieving and/or installing a battery, and more specifically a tool used to access one or more vertical levels of a battery storage facility.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Global demand for clean energy sources has driven an increase of renewable energy sources (e.g., wind, electrical, solar, and hydropower). Unfortunately, renewable energy demand (e.g., energy amount, energy location, time of day) may not align with renewable energy supply (e.g., generation). The renewable energy may be stored in large groups of batteries in battery storage facilities, particularly for large commercial, industrial, or power grid systems (e.g., grid-scale energy storage system). For example, the batteries may be stored at multiple levels and/or multiple floors of the battery storage facilities to maximize the energy storage per square foot. Unfortunately, the batteries may be large, heavy, and sensitive to damage if dropped, thereby complicating the installation, retrieval, and/or access to the batteries in such battery storage facilities.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system is provided that includes a tool of a battery installation and retrieval system. The tool includes a tray configured to support a battery and a battery drive assembly. The battery drive assembly includes a battery positioner used to move along an axial path of travel and a battery interconnect configured to couple the battery to the battery positioner. The battery drive assembly may also include a battery drive coupled to the battery positioner used to actuate the battery positioner to move the battery along the axial path of travel between a transfer state on the tray and a storage state in a battery rack.

In certain embodiments, a method includes deploying a tool of a battery installation and retrieval system at a battery rack, wherein the tool comprises a tray configured to support a battery, and a battery drive assembly including a battery positioner used to move along an axial path of travel, a battery interconnect used to couple the battery to the battery positioner, and a battery drive coupled to the battery positioner. The method also includes controlling the battery drive to actuate the battery positioner to move the battery along the axial path of travel between a transfer state on the tray and a storage state in a battery rack.

In certain embodiments, a system including a lift structure comprising a height adjustable platform coupled to a mobile power base via a lifting assembly and a tool coupled to the lift structure via a tool installation assembly. The tool includes one or more adjustment assemblies used to position the tool relative to a battery rack. The tool also includes a tray configured to support a battery. The tool also includes a battery drive assembly including a battery positioner configured to move along an axial path of travel, a battery interconnect configured to couple the battery to the battery positioner, and a battery drive coupled to the battery positioner, wherein the battery drive actuates the battery positioner to move the battery along from the axial path of travel between a transfer state on the tray and a storage state in the battery rack.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
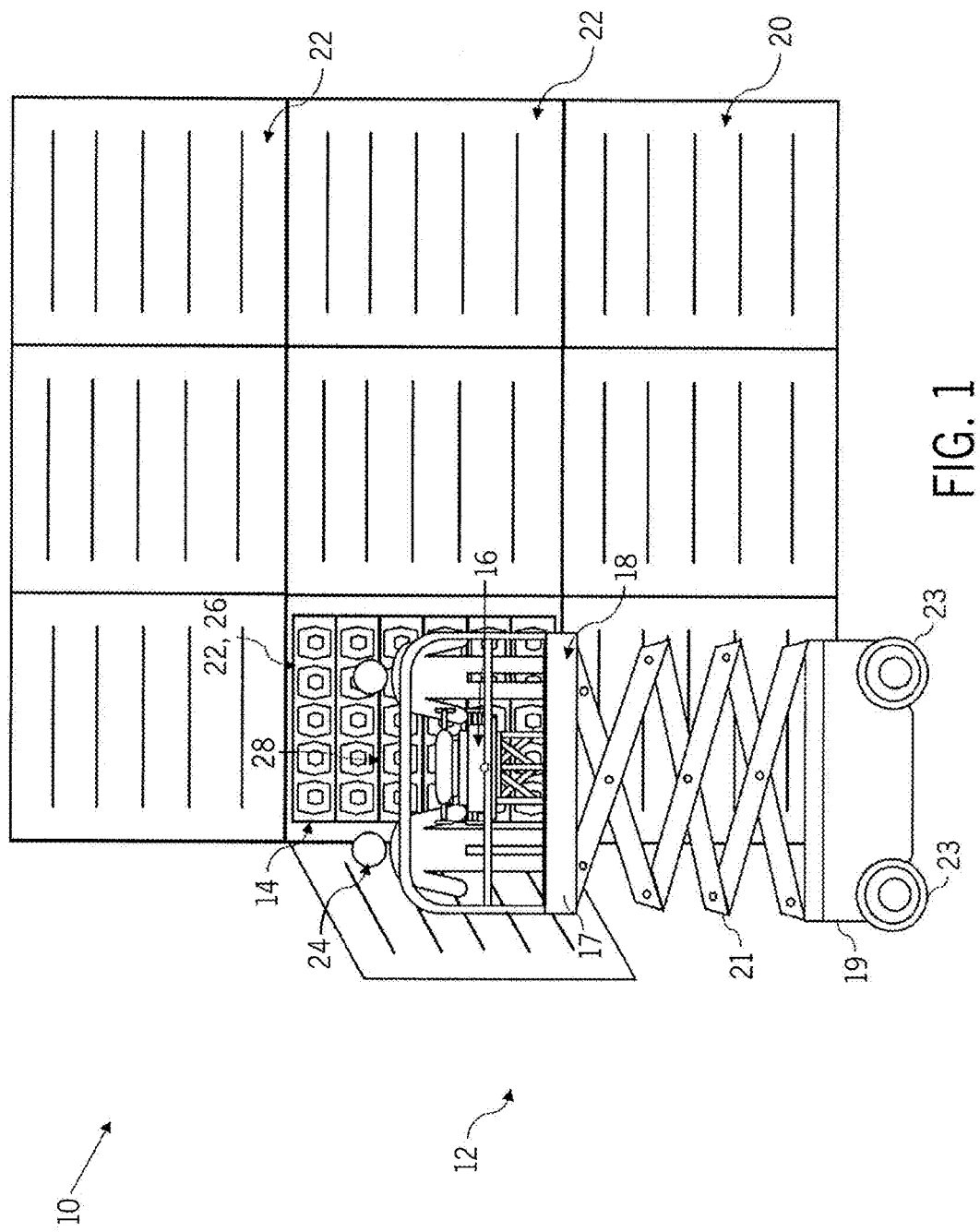
FIG. 1 is a schematic front view of a battery storage facility including a battery installation and retrieval system, in accordance with embodiments described herein.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

A battery storage facility may provide storage solutions to harness and store electrical energy via storage of hundreds or thousands of batteries. In this manner, energy produced by the battery storage facility may be accessed to provide energy to one or more processes (e.g., power grid, industrial system, and/or commercial system). The battery storage facility may include one or more batteries with a plurality of cells used to store energy from one or more source (e.g., renewable energy sources). In some instances, each battery in the battery storage facility may have a relatively high energy storage density. As such, compact storage of batteries may be advantageous. For example, storage of batteries and/or battery cells on top of one another (e.g., vertical stacks) may increase energy storage per area of the battery storage facility. In this manner, one or more battery racks may store batteries and/or battery cells in a stacked storage geometry. However, batteries and/or battery cells may require maintenance and/or replacement during storage. Techniques and tools for accessing batteries and/or battery cells at various heights (e.g., vertically stored above conventional access heights) are desired. As such, there is a need for a tool and techniques to safely maintain and replace batteries and/or battery cells stored at various heights within the battery storage facility.

Provided herein is a battery retrieval and installation system that may be used to safely access, maintain, install, and/or replace batteries and/or battery cells within the battery storage facility. The battery retrieval and installation system may include a tool (e.g., battery retrieval and installation tool) and a support structure, such as a lift structure (e.g., scissor lift, forklift, lift table, hydraulic lift, rail structure, and the like) or a fixed structure (e.g., framework). The tool may be attached to the support structure to access one or more levels of the battery storage facility. The tool may include a plurality of adjustment assemblies that may be used by the battery retrieval and installation system to position a tray of the tool in alignment with a battery rack of the battery storage facility. The adjustment assemblies may include vertical, rotational, lateral, axial, and/or angular (e.g., tilt) adjustment assemblies that may provide fine adjustments of the tool (e.g., the tray) relative to the battery rack. Additionally, the tool may include a battery drive assembly used to drive (e.g., push) a battery from the tray of the tool into the battery rack and/or drive (e.g., pull) the battery from the battery rack onto the tray of the tool at the battery facility. In this manner, the tool enables assisted transfer (e.g., installation, retrieval) of the batteries between the battery rack and the tool.

In some instances, transfer of the batteries may occur at various heights (e.g., vertical levels of the battery rack). For example, in some embodiments, a particular battery located on a second level of the battery rack within the battery facility may be marked for replacement. As such, the battery retrieval and installation system may be used to access the particular battery. The support structure may position the tool in an initial position (e.g., rough adjustment or position) in proximity to the particular battery. The plurality of adjustment assemblies (e.g., an axial adjustment assembly, a height adjustment assembly, a lateral adjustment assembly, a rotational adjustment assembly, a tilt adjustment assembly, or a combination thereof) of the tool may be used to make fine adjustments to the position of the tool relative to the battery rack in a service position of the tool (e.g., position for retrieval and/or installation, a retracted position, an extended position). In certain embodiments, the fine adjustments (e.g., the fine positional adjustments) may be less than or equal to 5, 10, 15, 20, 25, 30, 40, 50, 60, 70, 80, 90, or 100 centimeters along one or more axes and/or less than or equal to 5, 10, or 15 degrees about one or more axes of rotation. In some embodiments, the axial adjustment assembly of the tool may be used to move the tray of the tool from the retracted position away from the battery rack to the extended position adjacent to the battery rack, such that the battery drive assembly can be used to drive the particular battery between the battery rack and the tray of the tool.

With the foregoing in mind, FIG. 1 is a schematic front view of an embodiment of a battery storage facility 10 including a battery installation and retrieval system 12. In the illustrated embodiment, the battery installation and retrieval system 12 may be used to install, retrieve, and access one or more batteries 14 stored within the battery storage facility 10. The battery installation and retrieval system 12 may include a tool 16 disposed on a lift structure 18. As shown in the illustrated embodiment, the tool 16 may be removably coupled to the lift structure 18. It should be noted, that the battery storage facility 10 is an illustrative example of an environment for use in conjunction with the battery installation and retrieval system 12, and other applications are also contemplated to leverage the embodiments disclosed herein.

The lift structure 18 may include a powered lifting system (e.g., an aerial work platform (AWP)) having a height adjustable platform 17 coupled to a mobile power base 19 via a lifting assembly 21. The mobile power base 19 may include four wheels 23 to enable mobility along a ground surface. In the illustrated embodiment, the mobile power base 19 may include one or more electric motors, a combustion engine, a transmission, a fluid drive system (e.g., hydraulic system), or a combination thereof, to provide mechanical power to raise and lower the height adjustable platform 17 via the lifting assembly 21 and to drive the wheels 23 to move along the ground surface. For example, the lifting assembly 21 may include a scissor assembly, and thus the lift structure 18 may be described as a scissor lift. In operation, the lift structure 18 may provide a first positioning (e.g., rough or approximate positioning) of the tool 16 relative to the battery storage facility 10, whereas the tool 16 may provide a second positioning (e.g., fine positioning) of the tool 16 relative to the battery storage facility 10 before the tool 16 installs, retrieves, and/or accesses a battery 14.

In some embodiments, the battery storage facility 10 may include one or more battery racks 20. The battery racks 20 may include one or more portions 22 (e.g., battery receptacles) used to store the batteries 14. The portions 22 may be vertically and/or horizontally positioned (e.g., with respect to additional portions 22) within the battery rack 20. In this manner, the batteries 14 may be stored at one or more vertical levels of the battery storage facility 10. In the illustrated embodiment, one or more users 24 may access a specific portion 22, 26 of the battery rack 20 to retrieve and/or install a particular battery 28 via the battery installation and retrieval system 12. For example, the battery installation and retrieval system 12 may be used to retrieve the particular battery 28 from a second vertical level of the battery storage facility 10. The tool 16 may be coupled to the lift structure 18 to allow access to various vertical levels of the battery storage facility 10. In the illustrated embodiment, the lift structure 18 is a scissor lift. The lift structure 18 may be controlled by the users 24, an additional user, an external controller, or a combination thereof. It should be noted, that the scissor lift is an illustrative example of the lift structure 18 and other alternative structures are envisioned in embodiments of the present disclosure. In this manner, the lift structure 18 may include various structures that may provide access of the tool 16 to one or more vertical levels of the battery storage facility 10. For example, the various structures may include a fork lift, a lift table, a hydraulic lift, a motorized rail structure, a robotic support system, a cart, an automated lift, a frame, and the like.

Figure 2:
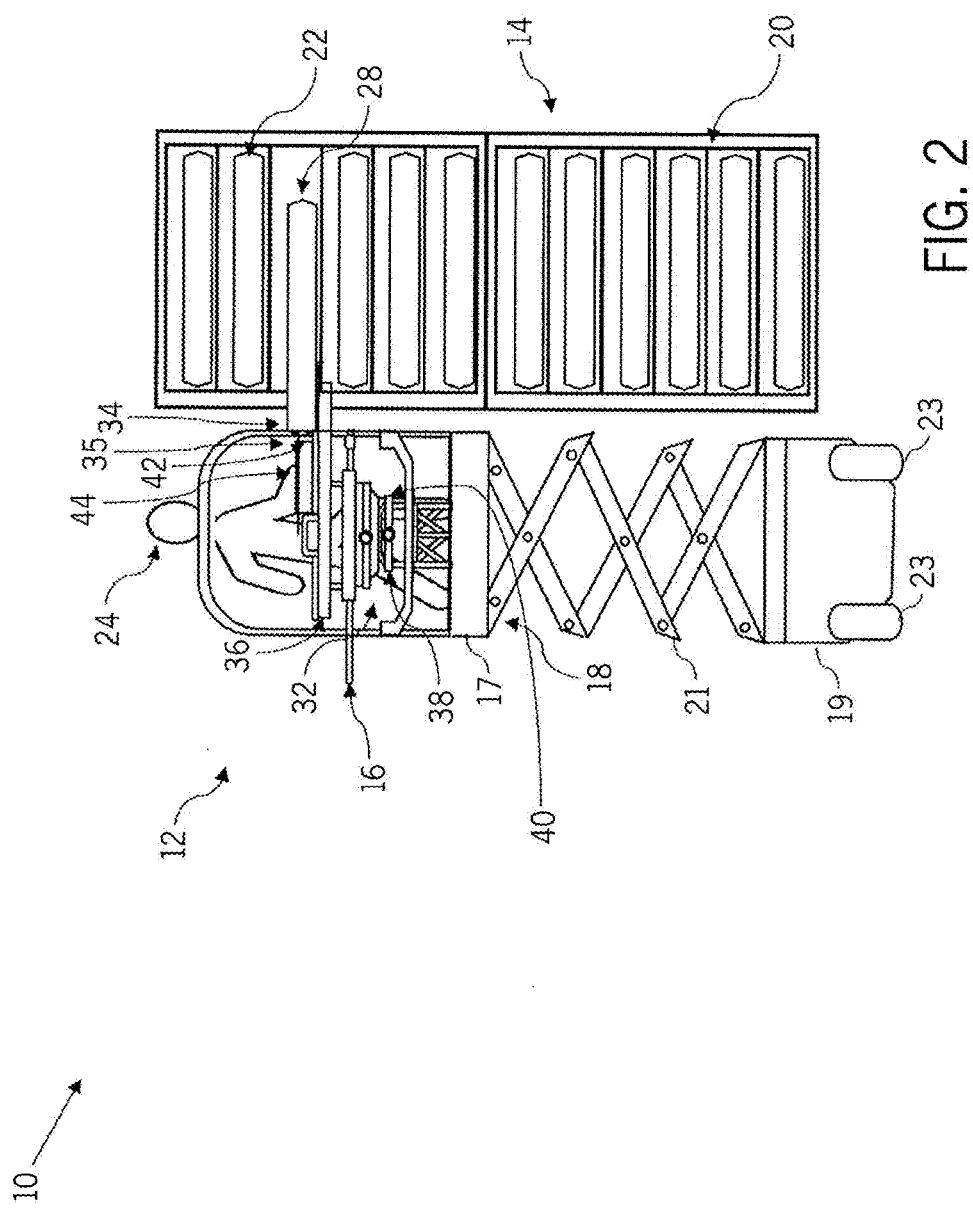
FIG. 2 is a schematic side view of the battery storage facility including the battery installation and retrieval system in a service position, in accordance with embodiments described herein.

In some embodiments, the tool 16 may be coupled to the lift structure 18 to provide access to the battery rack 20. In this way, the tool 16 in combination with the lift structure 18 may be used to install, remove, or access the batteries 14 relative to the battery rack 20. For example, the users 24 of the battery installation and retrieval system 12 may position the lift structure 18 in an initial position to bring the tool 16 in proximity to the specific portion 22, 26 of the battery rack 20. With this in mind, FIG. 2 is a schematic side view of an embodiment of the battery storage facility 10 including the battery installation and retrieval system 12 in a service position. The service position may support installation, removal, or access of the particular battery 28 relative to the specific portion 22, 26 of the battery rack 20. In some instances, the tool 16 may transition from a retracted position to an extended position to move portions of the tool 16 to engage with the specific portion 22, 26 of the battery rack 20. As such, the tool 16 (e.g., battery installation and retrieval tool), positioned on the lift structure 18 may transition between the retracted position and the extended position to install, retrieve, or access the particular battery 28 via one or more adjustment assemblies 32 (e.g., positional adjustments in a vertical direction, one or more horizontal directions, one or more rotational directions, and/or one or more angular directions) and/or a battery drive assembly 34 (e.g., a battery push/pull assembly). The adjustment assemblies 32 and/or the battery drive assembly 34 may position a portion 35 (e.g., a tray 36) of the tool 16 to support installation, retrieval, or access of the particular battery 28. For example, the battery drive assembly 34 may interconnect the particular battery 28 to one or more portions of the tool 16 to facilitate transfer of the particular battery 28 between the battery rack 20 and the tool 16. The battery drive assembly 34 includes a battery positioner 42 configured to move along an axial path of travel, a battery interconnect 44 configured to couple the particular battery 28 to the battery positioner 42, and a drive 38, 86 (e.g., a battery drive) configured to actuate the battery positioner 42 to move the particular battery 28 along the axial path of travel between a transfer state on the tray 36 and a storage state in the battery rack 20.

In the illustrated embodiment, the portion 35 of the tool 16 includes the tray 36; however, the portion 35 may include one or more support structures to support the particular battery 28. The tray 36 may be positioned in the extended position adjacent to the battery rack 20 at an interface of the particular battery 28 via the adjustment assemblies 32 of the tool 16. The drives 38 and/or the adjusters 40 may be used to positionally align the tray 36 relative to a battery receptacle (e.g., battery slot) in the battery rack 20, such that a particular battery 28 can be transferred between the tray 36 and the battery receptacle in the battery rack 20. In some instances, the adjustment assemblies 32 may move the tray 36, the drives 38, and/or the adjusters 40 from the extended position to the retracted position, and vice versa. The battery interconnect 44 of the battery drive assembly 34 may be used to interconnect the particular battery 28 to the tool 16. The battery positioner 42 of the battery drive assembly 34 may be used to set a position the particular battery 28 on a surface of the tray 36 and/or a battery receptacle in the battery rack 20. The battery drive 38, 86 is configured to actuate the battery positioner 42 to move the particular battery 28 along the axial path of travel between a transfer state on the tray 36 and a storage state in the battery rack 20 (e.g., in the battery receptacle). If the particular battery 28 is removed from the battery rack 20 via the tool 16, then the lift structure 18 may move the particular battery 28 away from the specific portion 22, 26 of the battery rack 20. In this manner, installation, replacement, maintenance, and/or additional actions may be performed via the battery installation and retrieval system 12. In some instances, a replacement battery (e.g., replacing the particular battery 28) may be subsequently installed in the specific portion 22, 26 of the battery rack 20 via the battery installation and retrieval system 12. It should be noted, that in some instances, maintenance to the particular battery 28 may be performed in the extended position and/or the retracted position by the users 24. As such, the particular battery 28 may be serviced for replacement into the specific portion 22,26 of the of the battery rack 20.

Figure 3:
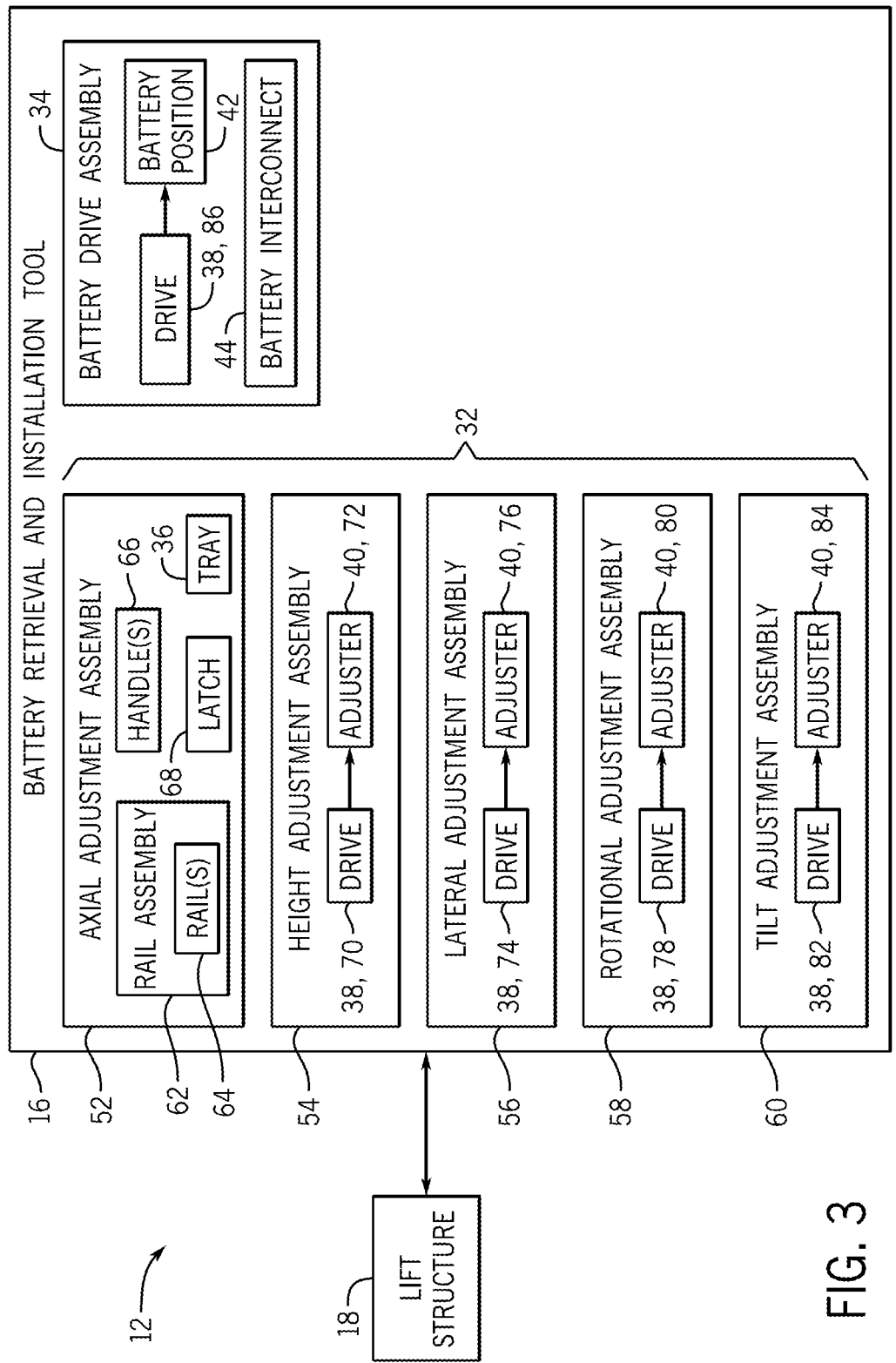
FIG. 3 is a block diagram of the battery installation and retrieval, in accordance with embodiments described herein.

FIG. 3 is a block diagram of an embodiment of the battery installation and retrieval system 12. The battery installation and retrieval system 12 may include a lift structure 18 and a tool 16 (e.g., battery installation and retrieval tool). In certain embodiments, the tool 16 is removably coupled to the lift structure 18 via one or more removable couplings. The removable couplings may include one or more clamps, straps, cables, locks, and/or fasteners (e.g., threaded fasteners) to couple with the height adjustable platform 17. In some embodiments, the tool 16 is affixed to the lift structure 18 via one or more fixed joints, such as a welded joint, a soldered joint, a brazed joint, an adhesive joint (e.g., epoxy, polyurethane, silicone), or any combination thereof. As illustrated, the tool 16 includes a plurality of adjustments assemblies 32 and a battery drive assembly 34.

The adjustment assemblies 32 may include an axial adjustment assembly 52, a height adjustment assembly 54, a lateral adjustment assembly 56, a rotational adjustment assembly 58, and a tilt adjustment assembly 60. The axial adjustment assembly 52 may include a rail assembly 62. The rail assembly may include one or more pairs of rails 64, wherein each pair of rails 64 includes a rail coupled to the tray 36 and a mating rail coupled to the tool 16. Each pair of rails 64 may include bearings to facilitate a smooth axial movement of the tray 36 along the tool 16. The axial adjustment assembly 52 may also include one or more handles 66, a latch 68, the tray 36, or a combination thereof. The rail assembly 62 of the axial adjustment assembly 52 may be configured to enable linear (e.g., axial, horizontal) adjustments of the tray 36 to interface with the battery rack 20 (e.g., perpendicular to a face of the battery rack 20). The handles 66 may be coupled to the tray 36. In some instances, the users 24 may use the handles 66 to guide the tray 36 along the rail assembly 62. That is, the tray 36 of the axial adjustment assembly 52 may be positioned by actuation of the rail assembly 62 via the handles 66. The tray 36 and/or the handles 66 may be formed from stainless steel, carbon steel, aluminum, an insulating material (e.g., plastics), or a combination thereof. In some instances, the tray 36 may be machined to support a battery shape (e.g., cylindrical, hexagonal, rectangular), a battery type (e.g., Lithium ion, Nickel-Hydrogen, Nickel Cadmium, Nickel Metal Hydride), a battery size, a battery material, a battery casing of the batteries 14. In some embodiments, the rail assembly 62 may be positioned below the tray 36. In this way, the users 24 may use the handles 66 to move the tray 36 along an axial direction. For example, the axial adjustment assembly 52 may position the tray 36 to interface with the battery rack 20. The latch 68 may be coupled to the tray 36 and provide an attachment point of the tray 36 of the tool 16 to the battery rack 20. As such, the attachment point may include a hook, a nose, a cam latch, a compression latch, a draw latch, a sliding latch, a magnetic latch, or any other suitable component to secure the tool 16 to the battery rack 20.

In some embodiments, each of the adjustment assemblies 32 (e.g., the height adjustment assembly 54, the lateral adjustment assembly 56, the rotational adjustment assembly 58, and the tilt adjustment assembly 60) may include one or more drives 38 (e.g., adjustment drives) and/or one or more adjusters 40 that may be used to position the tool 16 (e.g., fine positional adjustments) in proximity to and alignment with the one or more batteries 14 and/or portions 22 (e.g., battery receptacles) that house the batteries 14. The height adjustment assembly 54 may include a drive 38, 70 coupled to an adjuster 40, 72 configured to enable linear (e.g., axial, vertical) adjustments upward and downward relative to the battery rack 20 (e.g., parallel to the face of the battery rack 20). The lateral adjustment assembly 56 may include a drive 38, 74 coupled to an adjuster 40, 76 configured to enable linear (e.g., axial, horizontal) adjustments laterally leftward and rightward relative to the battery rack 20 (e.g., parallel to the face of the battery rack 20). The rotational adjustment assembly 58 may include a drive 38, 78 coupled to an adjuster 40, 80 configured to enable rotational adjustments (e.g., relative to one or more rotational axes, such as a vertical rotational axis) relative to the battery rack 20. The tilt adjustment assembly 60 may include a drive 38, 82 coupled an adjuster 40, 84 configured to enable rotational/tilt adjustments (e.g., relative to one or more rotational axes, such as a horizontal rotational axis) relative to the battery rack 20. It should be noted, that the tool 16 may not include all of the adjustment assemblies 32 described. In some embodiments, the tool 16 may only include a portion of the adjustment assemblies 32. For instance, the height adjustment assembly 54 may not be included in scenarios where a position of the structure 18 may be controlled with high accuracy.

The adjustment drives 38 (e.g., 70, 74, 78, and 82) may include one or more of an electric drive, a fluid drive (e.g., pneumatic or hydraulic drive), a mechanical drive (e.g., a spring), a manual drive (e.g., hand wheel or crank), or a drive interface (e.g., a torque tool interface), or any combination thereof. In certain embodiments, the drive interfaces are configured to enable an external power tool (e.g., electric torque tool) to provide force (e.g., torque) to actuate the adjusters 40 (e.g., 72, 76, 80, and 84). Accordingly, actuation of the adjusters 40 (e.g., 72, 76, 80, and 84) via the drives 38 may include electrical actuation, fluid driven actuation, mechanical actuation, manual (e.g., hand) actuation, external power tool actuation, or any combination thereof. In some embodiments, the drive interfaces may include a torque tool interface having a protrusion and/or recess shaped as a square, a rectangle, a hexagon, a star, or any combination thereof.

The adjusters 40 (e.g., 72, 76, 80, and 84) may include one or more of a gear assembly (e.g., a rack and pinion gear assembly, a worm gear and worm wheel assembly, etc.), a rail assembly (e.g., first and second rail portions that slide along one another), a piston-cylinder assembly, a rotational assembly (e.g., a rotational shaft, a hinged joint, a ball joint, etc.), or any combination thereof. For example, the gear assembly, the rail assembly, and/or the piston-cylinder assembly may be configured to enable linear (e.g., axial) adjustments along one or more axes of movement, such as one or more horizontal axes, a vertical axis, or other axes, to enable linear adjustments. In certain embodiments, the height adjustment assembly 54, and the lateral adjustment assembly 56 may include the gear assembly, the rail assembly, and/or the piston-cylinder assembly as the adjusters 40 (e.g., 72 and 76). By further example, the rotational adjustment assembly 58 may be configured to enable rotation about one or more horizontal axes, a vertical axis, or other axes, to enable rotational adjustments. In certain embodiments, the rotational adjustment assembly 58 may include the rotational shaft (e.g., vertical rotational axis) as the adjuster 40, 80, such that the rotational adjustment assembly 58 enables rotation about the vertical rotational axis. Additionally, the tilt adjustment assembly 60 may include the rotational shaft or hinged joint (e.g., horizontal rotational axis) as the adjuster 40, 84, such that the tilt adjustment assembly 60 enables rotation/tilt about the horizontal rotational axis. Additional details of the adjustment assemblies 32 is discussed in further detail below.

After the adjustment assemblies 32 align the tool 16, particularly the tray 36, with the battery rack 20 (e.g., a particular battery receptacle), then the battery drive assembly 34 may be used to drive (e.g., push) the battery 14 from the tray 36 into the battery rack 20 or drive (e.g., pull) the battery 14 from the battery rack 20 onto the tray 36. Thus, the adjustment assemblies 32 provide positional alignment between the tool 16 and the battery rack 20, whereas the battery drive assembly 34 helps install and remove the battery 14. In certain embodiments, the battery drive assembly 34 includes the drive 38, 86 (e.g., a battery drive), the battery positioner 42, the battery interconnect 44, or a combination thereof. The battery drive 38, 86 (e.g., a first drive) may be coupled to the battery positioner 42 to actuate the battery positioner 42 along an axial path of travel between the transfer state and the storage state. The battery drive 38, 86 may include one or more of an electric drive, a fluid drive (e.g., pneumatic or hydraulic drive), a mechanical drive (e.g., a spring), a manual drive (e.g., hand wheel or crank), a battery drive interface, or any combination thereof. In certain embodiments, the battery drive interface is configured to enable an external power tool (e.g., electric tool, a pneumatic tool, etc.) to provide force (e.g., rotational force or torque, axial force, etc.) to actuate the battery positioner 42. In some embodiments, the battery positioner 42 may include one or more of a gear assembly (e.g., a rack and pinion gear assembly, a worm gear and worm wheel assembly, etc.), a piston-cylinder assembly, or any combination thereof. For example, the battery positioner 42 may be configured to enable linear (e.g., axial) movement of the battery 14 along an axial path of travel between a transfer or service state on the tray 36 and a storage state in the battery rack 20.

The battery interconnect 44 (e.g., a rod 150) may be coupled to the battery positioner 42 via a battery interconnect interface. In certain embodiments, the battery interconnect 44 may be used to engage the batteries 14. In this manner, the battery interconnect 44 may be used to interface with the batteries 14 during transition of the batteries 14 from the storage state to the transfer state. The battery interconnect 44 may be formed by and/or coated with an insulating material (e.g., polyester, polypropylene, fiber glass, polytetrafluoroethylene, rubber, polyimide, and the like). The insulating material may provide safe engagement of the battery installation and retrieval system 12 with the batteries 14. In some embodiments, the battery interconnect 44 may include one or more blocks disposed along the battery interconnect 44. The blocks may be used to link the batteries 14 with the tool 16. In some instances, the battery interconnect 44 includes an end block positioned on a first end of the battery interconnect 44. The end block may be inserted into a portion of the batteries 14. In some instances, the battery interconnect 44 may be rotated to lock the end block into an engagement position. As such, a second end of the battery interconnect 44 may be coupled to the battery interconnect 44 via a battery interconnect interface. The second end of the battery interconnect 44 may include a single hooked end, a double hooked end, a threaded interface, a quarter turn, a T-bar, a handle, and/or one or more additional components to couple the battery interconnect 44 to the battery interconnect interface. In this way, the engagement position may couple the battery interconnect interface with the battery positioner 42. The battery interconnect 44 coupled with the battery positioner 42 may be actuated to move the batteries 14 onto the surface of the tray 36 through movement of the battery interconnect interface along an axis. In this manner, the batteries 14 may be moved to the transport position. The block, the end block, the first end of the battery interconnect 44, the second end of the battery interconnect 44, and/or the battery interconnect interface may be formed by and/or coated with an insulating material to provide insulated engagement of the battery installation and retrieval system 12 with the batteries 14. It should be noted, that in some embodiments, the battery interconnect 44 may include any suitable connector to physically engage the tool 16 to the battery 14. In this manner, the battery interconnect 44 may include a hook, a threaded shaft, a lock mechanism, or other suitable connectors that may contact the batteries 14 for retrieval and/or installation.

In some embodiments, the lift structure 18 includes an assembly (e.g., lift assembly, rail attachment assembly) that may be used to position the tool 16 in proximity to the batteries 14 of the battery storage facility 10. In some instances, the lift structure 18 may provide access to the batteries 14, allowing the batteries 14 to be installed and/or retrieved via the tool 16 by positioning the tool 16 (and particularly the tray 36) in alignment with the battery rack 20 supporting the stored batteries. In this manner, the adjustment assemblies 32 may be used to position the tray 36 at an interface of the battery rack 20 during installation and/or retrieval. In some instances, the lift structure 18 may position the tool 16 in an initial position (e.g., approximate position or rough alignment relative to the battery rack 20). The initial position may position the tool 16 in a rough or approximate alignment with the battery rack 20 and/or a particular battery receptacle in the battery rack 20. The tool 16 may be locked in a retracted position during positioning of the tool 16 to the initial position via the lift structure 18. The adjustment assemblies 32 may provide one or more fine adjustments to transition the tool 16 from the retracted position to the extended position. The fine adjustments may include a change to a height, a lateral position, a rotation angle, and/or a tilt of the tool 16. In certain embodiments, the fine adjustments may be less than or equal to 5, 10, 15, 20, 25, 30, 40, 50, 60, 70, 80, 90, or 100 centimeters along one or more axes (e.g., vertical axis, lateral axis parallel to the battery rack 20, axial axis perpendicular to the battery rack 20, or any other suitable axes), and/or the fine adjustments may be less than or equal to 5, 10, or 15 degrees about one or more axes of rotation. The fine adjustments also may be defined as percentages relative to dimensions of the tool 16 and/or the battery 14. For example, a height fine adjustment may be less than or equal to 5, 10, 15, or 20 percent of a total height of the tool 16 or the battery 14. By further example, a lateral fine adjustment may be less than or equal to 5, 10, 15, or 20 percent of a total lateral dimension (e.g., width) of the tool 16 or the battery 14. By further example, an axial fine adjustment may be less than or equal to 5, 10, 15, or 20 percent of a total axial dimension (e.g., length) of the tool 16 or the battery 14. It should be noted that the fine adjustments (e.g., fine positional adjustments) may be set along an allowable adjustment range within a travel length of the adjustment drives 38. That is, the fine adjustments may not be located at set increments along the travel length of the adjustment drives 38.

In this manner, the lift structure 18 provides a first positioning or rough alignment of the tool 16 relative to the battery rack 20, the adjustment assemblies 32 a second positioning or fine alignment of the tool 16 relative to the battery rack 20, and the battery drive assembly 34 transitions the batteries 14 between a storage state in the battery rack 20 and a transfer state on the tray 36 of the tool 16. The storage state of the batteries 14 may include storage within battery receptacles in the battery rack 20 of the battery storage facility 10. The transfer state may include placement of the batteries 14 on the tray 36 of the tool 16 via the battery drive assembly 34. In some instances, the batteries 14 may be moved from one portion of the battery storage facility 10 to one or more additional areas (e.g., an additional portion of the battery storage facility 10, one or more additional locations).

In certain embodiments, the axial adjustment assembly 52, the height adjustment assembly 54, the lateral adjustment assembly 56, the rotational adjustment assembly 58, the tilt adjustment assembly 60, or a combination thereof, may be used to make fine positional adjustments to the tool 16. For example, the rotational adjustment assembly 58 may be used to provide access to transition a particular battery 14 between the storage state and the transfer state. The lift structure 18 may position the tool 16 in the initial position. In some instances, the initial position may be angled away from the particular battery 14. In this manner, the rotational adjustment assembly 58 may provide via a circular platform. The circular platform may rotate the tool 16 around a central axis (e.g., vertical axis) to match an angle of the particular battery 14. Additionally and/or alternatively, the height adjustment assembly 54 may position the tool 16 via fine positional adjustments to ensure the tray 36 of the tool 16 is in alignment with the particular battery 14. In other embodiments, the lift structure 18 enables accurate positioning of the tool 16 according to certain directions and/or angles but not others. In such embodiments, the tool 16 may have certain adjustment assemblies but not all of the adjustment assemblies 32 described with respect to FIG. 3. For instance, in some embodiments, the tool 16 may include only the rotational adjustment assembly 58 and the tilt adjustment assembly 60 or only the lateral adjustment assembly 56.

In some embodiments, once the tool 16 is in substantial alignment with the batteries 14 and/or the battery rack 20, the battery drive assembly 34 may be used to push and/or pull the batteries 14 between the storage position and the transfer position. The battery drive assembly 34 may move the battery 14 along the axial path of travel between a transfer state on the tray 36 (e.g., battery positioned on the tray 36) and a storage state in a battery rack 20 (e.g., battery positioned in the battery rack 20). It should be noted, that in some embodiments, the adjustment assemblies 32 may not be needed to make fine positional adjustments to ensure the tray 36 and the tool 16 are in alignment. Further, in some instances, the battery drive assembly 34 may be used to install a battery 14 into the battery rack 20 by pushing the battery 14 into the battery rack 20. In some instances, the battery drive assembly 34 may be used to retrieve that battery 14 from the battery rack 20.

Figure 4:
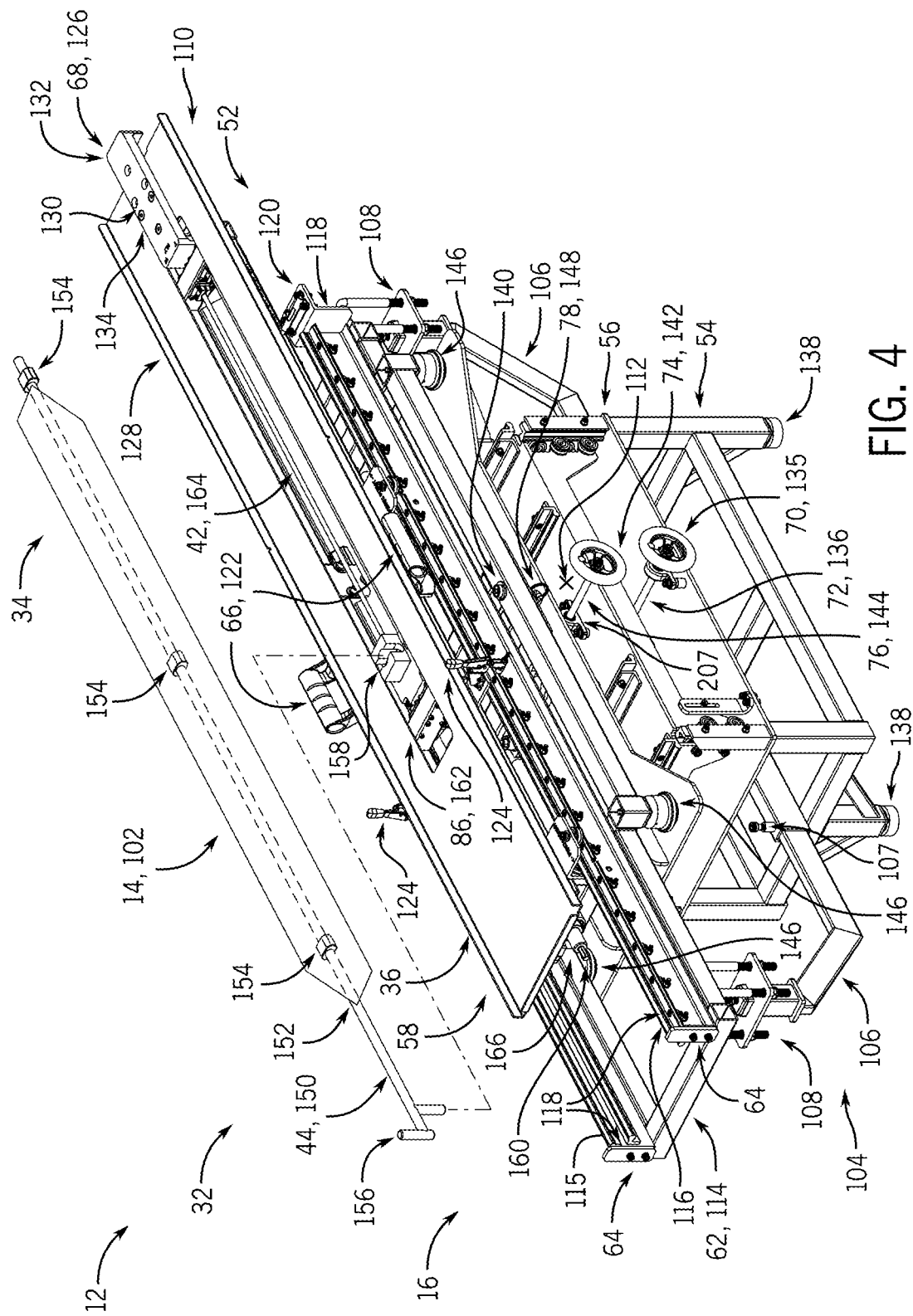
FIG. 4 is a perspective view of a tool of the battery installation and retrieval system, in accordance with embodiments described herein.

FIG. 4 is a perspective view of an embodiment of the tool 16 of the battery installation and retrieval system 12. As shown, the tool 16 of the battery installation and retrieval system 12 may be used to engage with a battery 14, 102. The tool 16 may include a plurality of adjustment assemblies 32 that may include various drives 38 (e.g., adjustment drives) and/or various adjusters 40. The tool 16 may include a battery drive assembly 34 that may be used to install and/or retrieve the battery 14, 102. The tool 16 may also include a tool installation assembly 104. The tool installation assembly 104 may be used to couple the tool 16 to the lift structure 18 and/or one or more stabilizing components that may ensure that the tool 16 is secure for transferring the battery 14, 102 from the storage state to the transfer state.

In some embodiments, the tool installation assembly 104 of the tool 16 may include one or more arms 106, one or more fasteners 108 (e.g., clamps), and/or additional pieces of componentry. The one or more arms 106 may be adjusted manually through extension and/or retraction. In some embodiments, the arms 106 may be retractable via a jack screw. Manual and/or mechanical retractability of the arms 106 may provide modularity of the tool 16 for fitting onto various structures. In some instances, the arms 106 may be secured in a position by a cap screw 107. It should be noted, that the illustrated arms 106 and fasteners 108 are one non-limiting embodiment of the tool installation assembly 104 and one or more additional configuration are envisioned. For example, in some instances, the fasteners 108 (e.g., clamps) of the tool installation assembly 104 may be secured to a guard rail system (e.g., hand rail system) of the height adjustable platform 17 to secure the tool 16 to the lift structure 18, thereby allowing the tool 16 to attach to rails of the battery rack 20 of the battery storage facility 10.

As illustrated, the battery installation and retrieval system 12 includes a plurality of adjustments assemblies 32, at least including the axial adjustment assembly 52 having the rail assembly 62, the handles 66, the latch 68, the tray 36, the height adjustment assembly 54 having the drive 70 coupled to the adjuster 72, the lateral adjustment assembly 56 having the drive 74 coupled to the adjuster 76, and the rotational adjustment assembly 58 having the drive 78 coupled to the adjuster 80 of FIG. 3. In certain embodiments, the battery installation and retrieval system 12 may further include the tilt adjustment assembly 60 having the drive 82 coupled to the adjuster 84 as illustrated in FIG. 3. The battery installation and retrieval system 12 includes the battery drive assembly 34 that may include the drive 86 (e.g., battery drive), the battery positioner 42, the battery interconnect 44, or a combination thereof.

In the illustrated embodiment, the tool 16 is shown in an extended position 110 (e.g., axially extended position of the tray 36 adjacent to the battery rack 20). It should be noted, that the tool 16 may be transferred between the retracted position and the transfer position (e.g., axially retracted position of the tray 36 away from the battery rack 20). The retracted position may ensure that the tool 16 and/or the battery 14, 102 is secure for movement via the lift structure 18. The extended position 110 may provide access to transfer of the battery 14, 102 from the storage state to the transfer state. As such, the extended position 110 may be achieved by positioning the tool 16 in approximate alignment with the battery rack 20 via the lift structure 18. Further, the extended position 110 may be set via fine adjustments of the tool 16 via the plurality of adjustment assemblies 32. In some embodiments, the tray 36 (e.g., carrier) of the axial adjustment assembly 52 may be extended relative to a center of gravity 112 of the tool 16. A position of the tray 36 may be changed through movement of the tray 36 on a rail assembly 62, 114. The tray 36 may be coupled to the rail assembly 62, 114 of the tool 16. Actuation of the rail assembly 62, 114 via one or more handles 66, 122 may allow the tray 36 to slide linearly (e.g., axially) towards the battery rack 20 and/or away from the battery rack 20. In this manner, the rail assembly 62, 114 may provide fine axial adjustments of the tray 36 to allow installation and retrieval of the battery 14, 102 by the battery drive assembly 34. The rail assembly 62, 114 may include the one or more rails 64 one or more hard stops 118, one or more barrel locks 120, one or more cam locks 124, and the like. The rails 64 of the rail assembly 62, 114 may include a first rail 115 and a second rail 116. It should be noted, that one or more additional rails may be included in the rail assembly 62, 114.

In some embodiments, the hard stops 118 of the rail assembly 62, 114 may block or prevent over travel of the tray 36 positioned on the rails 115, 116. In this manner, the hard stops 118 may be engaged during the retracted position. As shown, the tray 36 may not engage with the hard stops 118 in the extended position 110. As shown, the hard stops 118 may be located at either end of the rail assembly 62, 114. As such, the hard stops 118 may prevent overtravel of the tray 36 along the rail assembly 62, 114. The barrel locks 120 of the rail assembly 114 may be unlocked in the extended position 110. The cam locks 124 may secure the tray 36 in the retracted position. As such, the cam locks 124 may be disengaged in the extended position 110 to allow the tray 36 to slide over the rails 64 of the rail assembly 62, 114. In this manner, the tray 36 may be extended by the users 24 via the handles 66, 122 when the cam locks 124 are disengaged. In this manner, the tray 36 may be moved along the rails 115, 116 of the rail assembly 62, 114 until the latch 68 is positioned near (e.g., within a range of 6 inches, 5 inches, or 4 inches relative to) the battery racks 20. As such, in the extended position 110, the latch 68 of the tray 36 may be positioned towards the battery 14, 102. In the illustrated embodiment, the latch 68 includes a nose 126. The nose 126 may be attached to a first end 128 of the tray 36. The nose 126 may be coupled to the first end 128 of the tray 36 via one or more fasteners 130 (e.g., one or more screws, one or more nuts). The nose 126 may be made of plastic and/or other suitable insulating materials that may prevent electrical shortages of electrical components of the battery installation and retrieval system 12 and/or the battery storage facility 10.

It should be noted, that in some embodiments, the nose 126 may be fabricated with one or more ends (e.g., protruding hooks) that may be customized to interface with one or more different battery rack 20 interfaces of the battery storage facility 10. For example, various vertical levels of battery racks 20 may include different rack interfaces with various thickness, shape, and the like. In this manner, the nose 126 may be designed to include one or more interface on a single nose. For example, a first side 132 of the nose 126 may include an interface to interlock with a top rack of the battery storage facility 10. In some instances, a second side 134 of the nose 126 may include a second interface to interlock with one or more additional racks (e.g., not the top rack). As such, the user 24 may attach a certain interface (e.g., the interface on the first side 132, the second interface on the second side 134) to match a particular rack. In this manner, the nose 126 may be attached to the particular rack via a particular interface of the racks. In some instances, one or more additional noses may be fabricated to attach with one or more additional rack interfaces. In this manner, the additional noses may be interchanged based on the rack interfaces.

In some embodiments, the tray 36 may couple to the battery rack 20 via the latch 68 (e.g., the nose 126). In this manner, the nose 126 may hook onto (e.g., slide over, fit on) the battery rack 20 through adjustments of the axial adjustment assembly 52, the height adjustment assembly 54, the lateral adjustment assembly 56, the rotational adjustment assembly 58, and/or the tilt adjustment assembly 60. In this way, fine adjustments may be made to align the nose 126 to axially, vertically, laterally, and/or rotationally to ensure that the nose 126 may clear (e.g., position over surface) the battery rack 20. In some instances, clearance of the battery rack 20 between rails of the battery rack 20 may be achieved to access the battery 14, 102. Further, in some instances a height of the tool 16 may be increased to ensure clearance of the nose 126 over the battery rack 20. In this manner, the height of the tool 16 may be lowered to hook the nose 126 onto the battery rack 20.

With the foregoing in mind, in the illustrated embodiment, the drive 70 (e.g., height drive) of the height adjustment assembly 54 includes a mechanical or manual drive 135 (e.g., a handwheel) and the adjuster 72 (e.g., height adjuster) of the height adjustment assembly 54 includes a threaded adjuster 136. However, in certain embodiments, the drive 70 may include the manual drive 135, an electric drive, a fluid drive (e.g., a hydraulic or pneumatic drive), a tool interface to couple with an external drive tool, or any combination thereof. Additionally, in certain embodiments, the adjuster 72 may include the threaded adjuster 136, a rail assembly having first and second rails coupled together, a piston cylinder assembly, or any combination thereof. Fine adjustments of a height (e.g., vertical position) of the tool 16 may be made via the manual drive 135 (e.g., a handwheel). The threaded adjuster 136 may include a jack screw positioned in a worm-gear drive. The threaded adjuster 136 may be self-locking. That is, the tool 16 may change heights during engagement of the manual drive 135 and lock into a vertical position when the manual drive 135 is not actuated. The height adjustment assembly 54 may include one or more vertical travel stops. In some embodiments, fine adjustments to the vertical position of the tool 16 may be approximately less than 75 mm (e.g., maximum travel of the threaded adjuster 136).

The height adjustment assembly 54 may also include one or more leveling feet 138. The leveling feet 138 may be used to ensure that the tool 16 is positioned level on a surface of the lift structure 18 (e.g., height adjustable platform 17). The height adjustment assembly 54 may include a bubble level 140 for use in positioning the leveling feet 138. The leveling feet 138 may include a rotational stud that may be rotated clockwise and/or counterclockwise to adjust a height of the tool 16. In this manner, the leveling feet 138 may ensure that the tool 16 is level in scenarios in which a surface of the lift structure 18 (e.g., height adjustable platform 17) may be unlevel. For example, the height adjustable platform 17 may be uneven. In this manner, the tool 16 may not be level to the battery rack 20 in the initial position. In this manner, the leveling feet 138 may be used to adjust the tool 16 to ensure the tool 16 is level with respect to the battery rack 20 and the height adjustable platform 17.

In the illustrated embodiment, the drive 74 (e.g., lateral drive) of the lateral adjustment assembly 56 includes a mechanical or manual drive 142 (e.g., a handwheel) and the adjuster 76 (e.g., lateral adjuster) of the lateral adjustment assembly 56 includes a threaded adjuster 144. However, in certain embodiments, the drive 74 may include the manual drive 142, an electric drive, a fluid drive (e.g., a hydraulic or pneumatic drive), a tool interface to couple with an external drive tool, or any combination thereof. Additionally, in certain embodiments, the adjuster 76 may include the threaded adjuster 144, a rail assembly having first and second rails coupled together, a piston cylinder assembly, or any combination thereof. Fine adjustments of a lateral position of the tool 16 may be made via the manual drive 142. The threaded adjuster 144 may include a lead screw (e.g., ACME thread). The threaded adjuster 144 may be self-locking. That is, the tool 16 may change lateral positions during engagement of the manual drive 142 and lock into the lateral position when the manual drive 142 is not actuated. The lateral adjustment assembly 56 may include one or more shaft bearings. In some embodiments, fine adjustments to the lateral position of the tool 16 may be approximately less than 80 mm (e.g., physically limited by the shaft bearings).

In the illustrated embodiment, the drive 78 (e.g., rotational drive) of the rotational adjustment assembly 58 may be secured via a pin 148 (e.g., a lock pin) and the adjuster 80 (e.g., rotational adjuster) of the rotational adjustment assembly 58 may include a turntable as described below in reference to FIG. 5. In certain embodiments, the drive 78 may include an electric drive, a fluid drive (e.g., a hydraulic or pneumatic drive), a tool interface to couple with an external drive tool, or any combination thereof. Additionally, in certain embodiments, the adjuster 80 may include the turntable, a wheel assembly, a rotational stage assembly, or any combination thereof. Fine adjustments of a rotational position of the tool 16 may be made by changing an angle of the tray 36 relative to the battery racks 20. The turntable may rotate continuously or incrementally over a rotational range (e.g., approximately ±5, 10, or 15 degrees) to adjust the rotational position of the tray 36 when the lock pin is rotated to an unlocked position (e.g., turned 90 degrees from a locked position). That is, the tool 16 may adjust the rotational position by changing the angle of the turntable. The rotational adjustment assembly 58 may include one or more shaft bearings 146. In some embodiments, fine adjustments to the rotational position of the tool 16 may be approximately less than 80 mm. The rotational adjustment assembly 58 may include one or more one or more stop plates to prevent over-travel of the turntable. The stop plates may act as hard stops through interaction with the shaft bearings 146.

In the illustrated embodiment, the battery installation and retrieval system 12 is positioned in the extended position 110. As such, the battery 14, 102 may be retrieved from the battery rack 20 and/or installed into the battery rack 20. After initial positioning of the nose 126 via the handles 66, 122 of the axial adjustment assembly 52 and the fine adjustments (e.g., height, lateral, rotational, tile), a battery interconnect 44 (e.g., a rod 150) of the battery drive assembly 34 may be used to interface with the battery 14, 102. In some embodiments, the battery interconnect 44 (e.g., rod 150) may include one or more blocks 154 and/or one or more rod handles 156. In some embodiments, the one or more blocks 154 may be used to engage with one or more portions of the battery 14, 102. For example, the rod 150 may be inserted into an opening 152 of the battery 14, 102 in a retrieval position. The users 24 may position the rod 150 into the opening 152 using the rod handles 156. The opening 152 of the battery 14, 102 may allow the blocks 154 of the rod 150 to pass through the opening 152 when the rod 150 is positioned in a first position. In some embodiments, the rod 150 may be turned (e.g., approximately 90 degrees) to a second position once inserted into the opening 152 of the battery 14, 102. In the second position the blocks 154 of the rod 150 may engage with the battery 14, 102 to lock the rod 150 in the retrieval position.

In some embodiments, the rod handles 156 may be positioned to engage with a rod interface 158 (e.g., a battery interconnect interface) of the tool 16 in the second position. That is, rotation of the rod 150 may cause at least one rod handle 156 to engage with the rod interface 158 to lock the battery 14, 102 in position for removal from the battery rack 20. In some instances, and as further described in reference to FIG. 6, the at least one rod handle 156 may be positioned in the rod interface 158. The rod interface 158 may couple the rod 150 to the battery positioner 42, 164. The battery positioner 42,164 (e.g., a lead screw 164) of the battery drive assembly 34 may be actuated by a drive 86, 162 (e.g., a battery drive). In some instances, the drive 86, 162 may be coupled to a drive interface 160 (e.g., power tool interface, battery drive interface). In some embodiments, the drive interface 160 may include a hex interface 166. In this way, an external drive (e.g., a power drill, a power torque tool) may engage with the hex interface 166 to initiate actuation of the drive 86, 162 and/or the battery positioner 42, 164. As such, the battery 14, 102 may be pulled onto the tray 36 as the drive 82, 162 actuates the battery positioner 42, 164 (e.g., the lead screw) to move the rod interface 158. In this manner, the battery 14, 102 may be transitioned from the storage state to the transfer state. Further, the tray 36 may be moved to the extended position 110 as the tray 36 is centered relative to the center of gravity 112 of the tool 16, discussed below in reference to FIG. 7.

Figure 5:
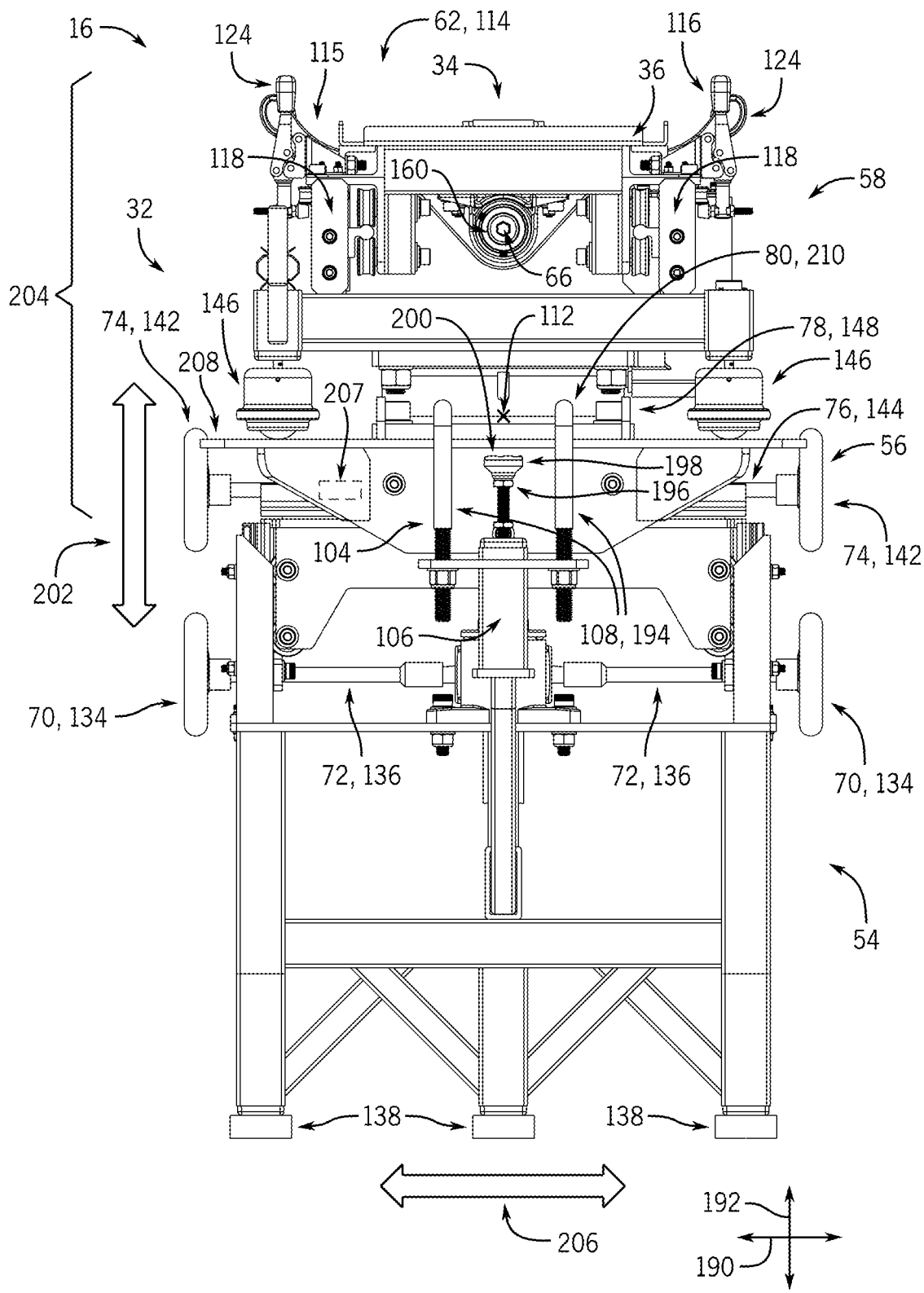
FIG. 5 is a rear view of the tool of the battery installation and retrieval, in accordance with embodiments described herein.

FIG. 5 is a schematic view of the tool 16 of the battery installation and retrieval system 12. In the illustrated embodiment, the tool 16 includes the plurality of adjustment assemblies 32 that may include various drives 38 (e.g., adjustment drives) and/or various adjusters 40. The tool 16 also includes the battery drive assembly 34. The tool 16 may also include the tool installation assembly 104 and the rail assembly 114. To aid the discussion, a set of axes will be referenced. For example, a lateral axis 190 may run perpendicular to first and second rails 115 and 116 of the rail assembly 114 of the tool 16, and a vertical axis 192 may run from the leveling feet 138 to the tray 36 of the tool 16.

In some embodiments, the tool installation assembly 104 may include the one or more fasteners 108 that may be used to secure the tool 16 to the lift structure 18. In some instances, the one or more fasteners may include one or more U-bolts 194, one or more locking nuts 196, one or more rubber pads 198, or a combination thereof. For example, during installation of the tool 16 onto the lift structure 18 (e.g., height adjustable platform 17), the tool installation assembly 104 may be used to secure the arms 106 of the tool 16 onto guard railing (e.g., hand railing) defining a boundary around the height adjustable platform 17 of the lift structure 18. In this manner, the U-bolts 194 and associated nuts and washers may be removed from the tool 16 and the rubber pads 198 may be retracted to position the guard railing of height adjustable platform 17 on a surface 200 of the rubber pad 198. The U-bolts 194 may be replaced once the guard railing of height adjustable platform 17 is positioned on the surface 200 of the rubber pad 198. In this manner, the rubber pad 198 may be tightened via the locking nuts 196 to secure the guard railing of height adjustable platform 17 between the surface 200 of the rubber pad 198 and the U-bolts 194. It should be noted, the U-bolts 194, the locking nuts 196, and the rubber pads 198 is one non-limiting embodiment of the tool installation assembly 104 and other suitable componentry may be used to secure the tool 16 to the lift structure 18 of the battery installation and retrieval system 12.

In some embodiments, as mentioned in reference to FIG. 4, the battery installation and retrieval system 12 may make fine adjustments to position the tool 16 for retrieval of the batteries 14. For example, the height adjustment assembly 54 may vary a height 202 of the tool 16. In this manner, the height 202 may be positioned by changing the position of the leveling feet 138. In some embodiments, the height adjustment assembly 54 may vary the height of the tray 36 through actuation of the drive 70 (e.g., the manual drive 135). In this manner, a portion 204 of the tool 16 may be actuated via the adjuster 72. As such, fine adjustments of the height 202 may be made to ensure the tray 36 of the tool 16 aligns with the battery rack 20 and/or batteries 14 for retrieval. Additionally and/or alternatively, a lateral position 206 of the tray 36 of the tool 16 may be adjusted by the lateral adjustment assembly 56. That is, the drive 74 (e.g., the handwheel 142) may be actuated to adjust the lateral position 206 of the portion 204 of the tool 16. In this manner, the portion 204 of the tool 16 may travel along the lateral axis 190. In some instances, one or more shaft bearings 207 may be used as travel stops to limit lateral movement of the portion 204 of the tool 16. For example, the shaft bearings 207 may be positioned on the drive 74 of the tool 16. In this manner, the shaft bearings 207 may prevent overtravel during adjustment of the lateral position 206 of the portion 204 of the tool 16.

In certain embodiments, the rotational adjustment assembly 58 may include the drive 78 that may be secured via a pin 148 (e.g., a lock pin) and the adjuster 80 of the rotational adjustment assembly 58 may include a turntable 210. The turntable 210 may be positioned on a surface 208 below the rail assembly 114 of the tool 16. In this manner, the rail assembly 114 and the tray 36 may be rotated with respect to the center of gravity 112 of the tool 16 to adjust the angle of the tray 36 relative to the battery rack 20 and/or the batteries 14. The turntable 210 may be locked when the pin 148 is in a locked position. In some instances, the turntable 210 may be adjusted (e.g., rotated) with the pin 148 in an unlocked position. As such, the shaft bearings 146 may act as hard stops to limit rotation of the tray 36 via the turntable 210. In this manner, the shaft bearings 146 may move laterally along the surface 208 for a particular distance (e.g., 50 mm, 60 mm, 70, mm, 80 mm, 90 mm, 100 mm). As such, the shaft bearings 146 act as hard stops during adjustment of rotational adjustment of the tool 16.

Figure 6:
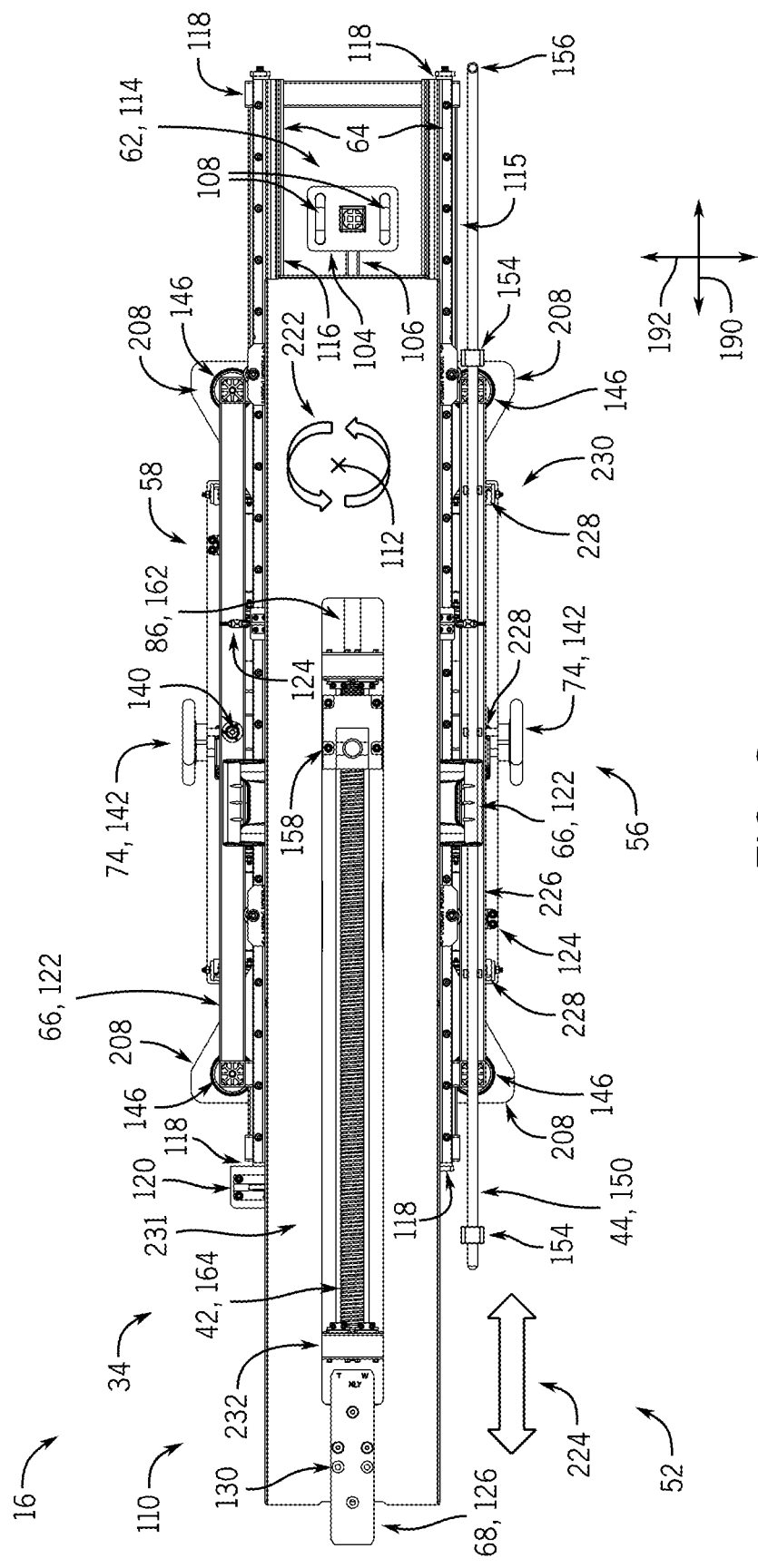
FIG. 6 is a top view of the tool of the battery installation and retrieval system, in accordance with embodiments described herein.

FIG. 6 is a top view of an embodiment of the tool 16 of the battery installation and retrieval system 12. To aid the discussion, a set of axes will be referenced. For example, a lateral axis 190 may run perpendicular to the rails 64 of the rail assembly 62, 114 of the tool 16, and an axial axis 220 may run parallel to the first and the rails 64 of the tool 16. In some embodiments, the rotational adjustment assembly 58 may control a rotational position 222 of the rail assembly 62, 114 of the tool 16 through actuation of the turntable 210. In this manner, the rotational position 222 of the tray 36 may be continuously or incrementally varied over a rotational range (e.g., at least up to ±3 degrees, ±5 degrees, ±8 degrees, and the like). In this manner, as the rotational position 222 of the tool 16 is set, an axial position 224 of the tool 16 may be adjusted to the extended position 110. In this manner, the users 24 (not shown in the illustrated embodiment) may change the axial position 224 to position the tray 36 of the tool 16. The tray 36 may be moved via the handles 66, 122 along the axial axis 220. In this manner, the latch 68 (e.g., nose 126) of the tool 16 may extend away from the center of gravity 112 of the tool 16. The handles 66, 122 may be used to position the tray 36 to allow the latch 68 to secure on the battery rack 20 in the extended position 110. The drive 86, 162 and the battery positioner 42, 164 of the battery drive assembly 34 may be used to retrieve the battery 14 from the battery rack 20.

In some embodiments, the rod 44, 150 (e.g., rod interconnector) may be removed from a storage position 226 to be used for retrieval of the battery 14. The storage position 226 of the rod 44, 150 may secure the rod 44, 150 via or more clips 228 to a side 230 of the rail assembly 114. In the illustrated embodiment, the rod 44, 150 is secured to the side 230 of the rail assembly 62, 114 of the first rail 115. The users 24 may remove the rod 44, 150 from the clips 228 and position the rod 44, 150 through the opening of the battery 14, engaging the blocks 154 of the rod 44, 150. The rod handles 156 of the rod 44, 150 may be coupled to the rod interface 158 (e.g., rod interconnector interface). In this way, an external drive (e.g., a power drill, a power torque tool) may be attached to the drive interface 160 to actuate the drive 86, 162 (e.g., battery drive) to move the battery positioner 42, 164 (e.g., lead screw). In this manner, the battery positioner 42, 164 may move along the axial axis 220 to position the battery 14 on a surface 231 of the tray 36. The battery drive assembly 34 may include a hard stop 232 to ensure that the battery positioner 42, 164 may not travel further than a length 234 of the tray 36. In this manner, the battery 14 may be positioned on the surface 231 of the tray 36. In certain embodiments, the battery 14 is secured on the surface 231 of the tray 36 and the axial position 224 of the tray 36 may be manually retracted to the retracted position via the axial adjustment assembly 52. In this manner, the tool 16 may be locked via the cam locks 124 and the barrel locks 120 into the retracted position for transport of the battery 14 and the tool 16 via the lift structure 18.

Figure 7:
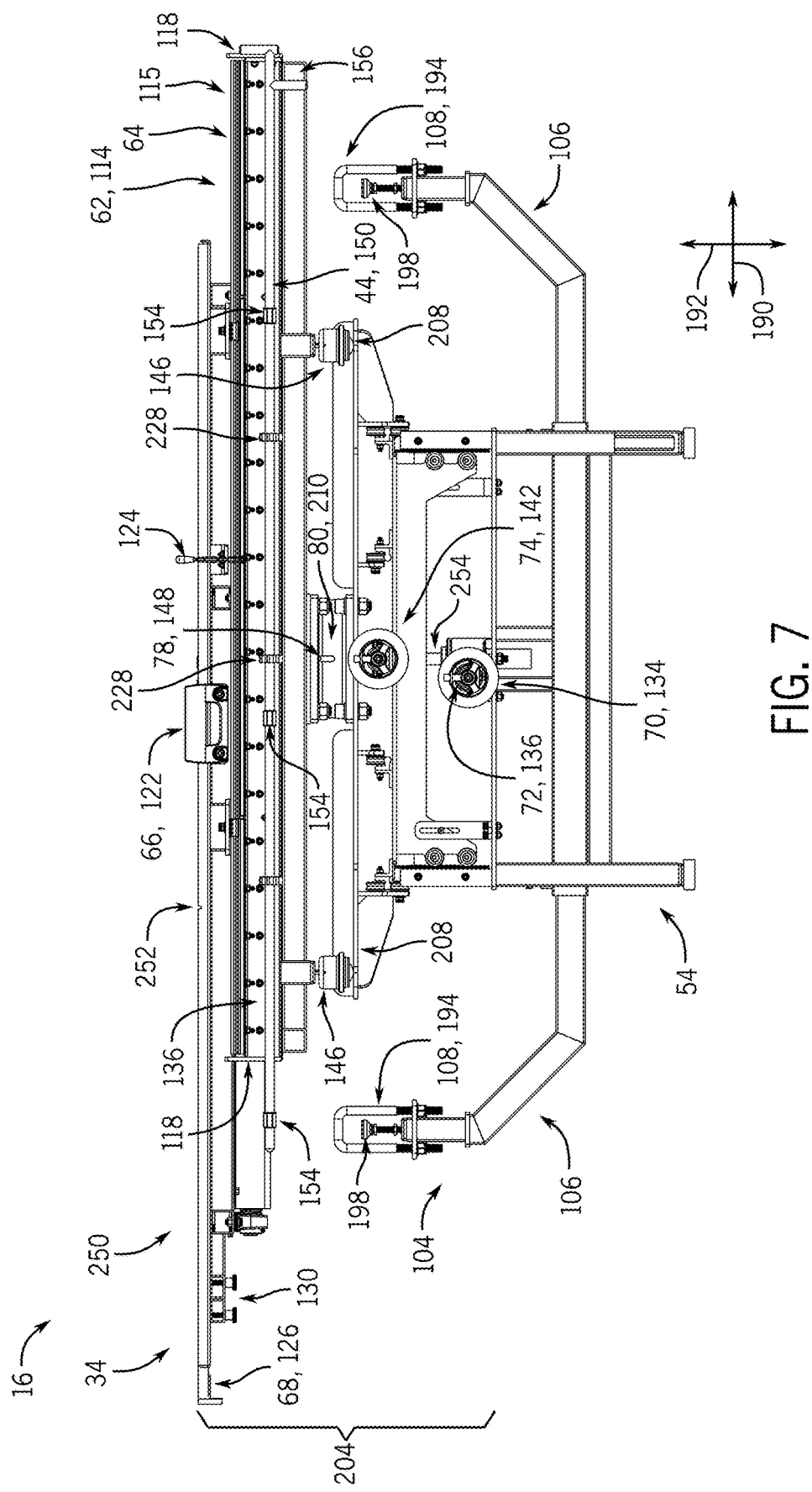
FIG. 7 is a side view of the tool of the battery installation and retrieval system, in accordance with embodiments described herein.

FIG. 7 is a side view of an embodiment of the tool 16 of the battery installation and retrieval system 12. To aid the discussion, a set of axes will be referenced. For example, a vertical axis 192 may run from the leveling feet 138 to the tray 36 of the tool 16, and an axial axis 220 may run parallel to the rails 64 and the tray 36 of the tool 16. In the illustrated embodiment, the tool 16 is in a retracted position 250 (e.g., axially retracted position of the tray 36 away from the battery rack 20) and may be locked for transport of the tool 16 and/or the batteries 14 via the lift structure 18. In certain embodiments, as the axial position 224 of the tray 36 is transitioned between the retracted position 250 and the extended position 110 via the axial adjustment assembly 52, a notch 252 may be provided on one or more sides of the tray 36 to serve as a visual aid. In this manner, the notch 252 may serve as the visual aid to align the batteries 14 with the tray 36 to ensure that the tool 16 may be in alignment with the batteries 14.

In some embodiments, the drive 70 (e.g., handwheel 135) may actuate the adjuster 72 (e.g., the threaded adjuster 136) of the height adjustment assembly 54. In this way the height 202 of the portion 204 of the tool 16 may be adjusted as the handwheel 135 varies a position of the threaded adjuster 136 along a vertical shaft 254. For example, the height 202 of the tray 36 of the tool 16 may be adjusted to fit the latch 68 (e.g., the nose 126) over an edge of the battery rack 20. In this manner, the height 202 may be increased via actuation of the threaded adjuster 136 via the handwheel 135. Further, in some instances, the height 202 may be decreased when the nose 126 clears the edge of the battery rack 20. It should be noted, that in some instances, the nose 126 is coupled to the tray 36 via the one or more fasteners 130. The fasteners 130 may include one or more screws, one or more hand nuts, and the like. In this manner, the nose 126 may interface with one or more different battery rack interfaces of the battery storage facility 10 via one or more interfaces of the nose 126.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Technical effects of the disclosed embodiments include a tool 16 for installing, removing, or accessing batteries 14 in a battery rack 20. The tool 16 may be moved horizontally and vertically via the lift structure 18 to a desired rack position (e.g., approximately or rough position of the battery rack 20), while the tool 16 itself provides fine adjustments in a vertical position, a lateral position, a rotational position, and/or a tilt orientation prior to installation or removal of the battery 14 relative to the battery rack 20. Once in a suitable position (e.g., tray 36 aligned with the battery rack 20), the axial adjustment assembly 52 of the tool 16 may be used to extend the tray 36 toward the battery rack 20, and then latch the tray 36 to the battery rack 20. The battery drive assembly 34 may be used to drive the battery 14 between the tray 36 and the battery rack 20 to install or remove the battery 14 relative to a battery receptacle in the battery rack 20. The tool 16 may be particularly beneficial in installing and removing batteries 14 in battery racks 20 having multiple vertical levels, such as in grid-scale energy storage systems. The tool 16 helps improve user safety, reduce risks of damaging the batteries 14, and reduces time and labor associated with installing and removing the batteries 14 in battery racks 20. For example, the tool 16 may reduce the number of users needed for installing and removing batteries 14 in battery racks 20, while also reducing the amount of time needed for such battery installations and removals.

The subject matter described in detail above may be defined by one or more clauses, as set forth below.

A system is provided that includes a tool of a battery installation and retrieval system. The tool includes a tray configured to support a battery and a battery drive assembly. The battery drive assembly includes a battery positioner used to move along an axial path of travel and a battery interconnect configured to couple the battery to the battery positioner. The battery drive assembly may also include a battery drive coupled to the battery positioner used to actuate the battery positioner to move the battery along the axial path of travel between a transfer state on the tray and a storage state in a battery rack The system of the preceding clause, wherein the tool comprises an axial adjustment assembly comprises a rail assembly coupled to the tray, wherein the rail assembly is configured to enable movement of the tray along an axial axis via one or more handles and a latch configured to secure the tray to the battery rack.

The system of any preceding clause, wherein the battery interconnect is removably coupled to the battery positioner via a battery interconnect interface.

The system of any preceding clause, wherein the battery drive comprises a battery drive interface configured to interface with an external tool configured to actuate the battery positioner.

The system of any preceding clause, wherein the tool comprises one or more adjustment assemblies, wherein the one or more adjustment assemblies include at least one or more of an axial adjustment assembly, a height adjustment assembly, a lateral adjustment assembly, a rotational adjustment assembly, a tilt adjustment assembly, or a combination thereof, wherein each adjustment assembly of the one or more adjustment assemblies is configured to adjust a position of the tray relative to the battery rack.

The system of the preceding clause, wherein the one or more adjustment assemblies comprise one or more adjustment drives, wherein the one or more adjustment drives comprise a mechanical drive and/or a manual drive.

The system of any preceding clause, wherein the one or more adjustment assemblies are configured to make one or more fine positional adjustments to the tool.

The system of the preceding clause, wherein the one or more fine positional adjustments are configured to position the tray in alignment with the battery rack.

The system of any preceding clause, wherein the battery interconnect comprises a rod having one or more blocks configured to engage the battery.

The system of any preceding clause, wherein the battery installation and retrieval system comprises a lift structure.

The system of any preceding clause, wherein the tool comprises a tool installation assembly configured to couple the tool to the lift structure.

A method includes deploying a tool of a battery installation and retrieval system at a battery rack, wherein the tool comprises a tray configured to support a battery, and a battery drive assembly including a battery positioner used to move along an axial path of travel, a battery interconnect used to couple the battery to the battery positioner, and a battery drive coupled to the battery positioner. The method also includes controlling the battery drive to actuate the battery positioner to move the battery along the axial path of travel between a transfer state on the tray and a storage state in a battery rack.

The method of the preceding clause, comprising adjusting one or more positions of the tool to align the tray relative to the battery rack.

The method of the preceding clause, wherein the one or more positions comprise an axial position, a vertical position, a lateral position, a rotational position, an angular position, or a combination thereof.

The method of the preceding clause, comprising adjusting an axial position of the tray between a retracted position away from the battery rack and an extended position adjacent the battery rack via a rail assembly coupled to the tray.

The method of any preceding clause, comprising locking the tray to the battery rack in the extended position via a latch.

The method of any preceding clause, comprising moving the tool via a lift structure having a height adjustable platform coupled to a mobile power base via a lifting assembly, wherein the tool comprises a tool installation assembly coupling the tool to the lift structure.

A system including a lift structure comprising a height adjustable platform coupled to a mobile power base via a lifting assembly and a tool coupled to the lift structure via a tool installation assembly. The tool includes one or more adjustment assemblies used to position the tool relative to a battery rack. The tool also includes a tray configured to support a battery. The tool also includes a battery drive assembly including a battery positioner configured to move along an axial path of travel, a battery interconnect configured to couple the battery to the battery positioner, and a battery drive coupled to the battery positioner, wherein the battery drive actuates the battery positioner to move the battery along from the axial path of travel between a transfer state on the tray and a storage state in the battery rack.

The system of the preceding clause, wherein the one or more adjustment assemblies comprise a height adjustment assembly configured to adjust a vertical position of the tray, a rotational adjustment assembly configured to adjust a rotational position of the tray, a lateral adjustment assembly configured to adjust a lateral position of the tray, a tilt adjustment assembly configured to adjust an angular position of the tray.

The system of any preceding clause, wherein the one or more adjustment assemblies comprise an axial adjustment assembly having a rail assembly coupled to the tray, wherein the rail assembly is configured to enable movement of the tray along an axial axis between a retracted position away from the battery rack and an extended position adjacent the battery rack.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to

The invention claimed is:

1. A system, comprising:
a tool of a battery installation and retrieval system, wherein the tool comprises:
a tray configured to support a battery;
a battery drive assembly, comprising:
a battery positioner coupled to the tray, wherein the battery positioner is configured to move along an axial path of travel;
a battery interconnect configured to couple the battery to the battery positioner and the tray; and
a battery drive coupled to the battery positioner, wherein the battery drive is configured to actuate the battery positioner to move the battery along the axial path of travel between a transfer state on the tray and a storage state in a battery rack; and
an axial adjustment assembly comprising:
a rail assembly coupled to the tray, wherein the rail assembly is configured to enable movement of the tray along the axial path of travel via one or more handles; and
a latch directly coupled to the tray, wherein the latch is configured to secure the tray to the battery rack.

2. The system of claim 1, wherein the battery interconnect is removably coupled to the battery positioner via a battery interconnect interface.

3. The system of claim 1, wherein the battery drive comprises a battery drive interface configured to interface with an external tool configured to actuate the battery positioner.

4. The system of claim 1, wherein the tool comprises a plurality of adjustment assemblies, wherein the plurality of adjustment assemblies includes the axial adjustment assembly and one or more of a height adjustment assembly, a lateral adjustment assembly, a rotational adjustment assembly, or a tilt adjustment assembly, wherein each adjustment assembly of the plurality of adjustment assemblies is configured to adjust a position of the tray relative to the battery rack.

5. The system of claim 4, wherein the plurality of adjustment assemblies comprises one or more adjustment drives, wherein the plurality of adjustment drives comprises a manual drive.

6. The system of claim 4, wherein the plurality of adjustment assemblies are configured to make one or more fine positional adjustments to the tool, and wherein the one or more fine positional adjustments are less than or equal to a maximum distance range of 100 centimeters along one or more axes and/or less than or equal to a maximum angular range of 15 degrees about one or more axes of rotation.

7. The system of claim 1, wherein the battery interconnect comprises a rod having one or more blocks configured to internally engage with the battery; and wherein the rod is positioned through an opening of the battery.

8. The system of claim 1, wherein the battery installation and retrieval system comprises a lift structure and a height adjustment assembly, wherein the lift structure and the height adjustment assembly provide independent ranges of vertical movement that collectively define a height of the tray supporting the battery.

9. The system of claim 8, wherein the tool comprises a tool installation assembly configured to couple the tool to the lift structure.

10. The system of claim 1, wherein the battery interconnect couples to the battery through an opening of the battery.

11. A method comprising:
deploying a system at a battery rack, the system comprising:
a tool of a battery installation and retrieval system, wherein the tool comprises:
a tray configured to support a battery; and
a battery drive assembly, comprising:
a battery positioner coupled to the tray, wherein the battery positioner is configured to move along an axial path of travel;
a battery interconnect configured to couple the battery to the battery positioner and the tray; and
a battery drive coupled to the battery positioner, wherein the battery drive is configured to actuate the battery positioner to move the battery along the axial path of travel between a transfer state on the tray and a storage state in the battery rack;
adjusting one or more positions of the tool to align the tray relative to the battery rack, wherein the one or more positions comprise an axial position, a vertical position, a lateral position, a rotational position, and an angular position; and
using the battery drive of the tool to actuate the battery positioner of the tool to move the battery supported by the tray of the tool along the axial path of travel between the transfer state on the tray and the storage state in the battery rack.

12. The method of claim 11, comprising adjusting the axial position of the tray between a retracted position away from the battery rack and an extended position adjacent the battery rack via a rail assembly coupled to the tray.

13. The method of claim 12, comprising locking the tray to the battery rack in the extended position via a latch.

14. The method of claim 11, comprising moving the tool via a lift structure having a height adjustable platform coupled to a mobile power base via a lifting assembly, wherein the tool comprises a tool installation assembly coupling the tool to the lift structure.

15. A system, comprising:
a lift structure comprising a height adjustable platform coupled to a mobile power base via a lifting assembly; and
a tool coupled to the lift structure via a tool installation assembly, wherein the tool comprises:
one or more adjustment assemblies, wherein the one or more adjustment assemblies are configured to position the tool relative to a battery rack;
a tray configured to support a battery; and
a battery drive assembly, comprising:
a battery positioner coupled to the tray, wherein the battery positioner is configured to move along an axial path of travel;

a battery interconnect configured to couple the battery to the battery positioner and the tray; and a battery drive coupled to the battery positioner, wherein the battery drive is configured to actuate the battery positioner to move the battery along from the axial path of travel between a transfer state on the tray and a storage state in the battery rack.

16. The system of claim 15, wherein the one or more adjustment assemblies comprise:

an axial adjustment assembly configured to adjust an axial position of the tray;

a height adjustment assembly configured to adjust a vertical position of the tray;

a rotational adjustment assembly configured to adjust a rotational position of the tray; and a lateral adjustment assembly configured to adjust a lateral position of the tray.

17. The system of claim 15, wherein the one or more adjustment assemblies comprise an axial adjustment assembly having a rail assembly coupled to the tray, wherein the rail assembly is configured to enable movement of the tray along an axial axis between a retracted position away from the battery rack and an extended position adjacent the battery rack.

* * * * *